Patented Feb. 8, 1938

2,107,702

UNITED STATES PATENT OFFICE 2,107,702

IMPROVED METHOD OF MANUFACTURING AN AGGLOMERATED POTASSIUM CHLORIDE FERTILIZER

Karl Haase, Helmut Werth, and Hermann Probst, Bleicherode, Germany, assignors to the firm Preussische Bergwerks- und Hütten-Aktiengesellschaft, Berlin, Germany No Drawing. Application January 16, 1935, Serial No. 2,056. In Germany September 11, 1934

8 Claims. (Cl. 71—61)

The present invention relates to an improved process of manufacturing a granulated, especially coarsely granulated potassium chloride fertilizer from potassium chloride or from a starting material (potassium crude salt) containing said chloride, or from corresponding mixtures, there being at the same time other salts necessary for the building-up of the plant introduced into the potassium fertilizer, or if this latter already contains such other salts they are enriched and their amount is increased.

The commercial potassium chloride fertilizing salt consisting of potassium chloride or of a mixture thereof with sodium chloride is often times in a finely granulated, if not even floury, state and in most cases either free from calcium salts and from magnesium salts or contains only small amounts of these salts which are requisite for the building-up of the plant. The floury or pulverulent state of the salts mentioned interiorates the good seizableness and the storableness of the potassium fertilizer, and proves sometimes disadvantageous or is at least undesired when being distributed by strewing.

Now, according to this invention, pulverulent potassium chloride and mixtures thereof with other salts can be transformed into globular, comparatively coarse grains, and be provided at the same time with calcium salts and magnesium salts, if the starting material is intimately mixed with a certain amount, small in proportion to the amount of the starting material, of pulverulent burnt lime, or calcium oxide respectively, whereafter the mixture is uniformly soaked with an aqueous magnesium sulphate solution. Within the starting material the two added substances, i. e. the calcium oxide and the magnesium sulphate, react according to the known equation $$CaO + MgSO_4 + 3H_2O = CaSO_4 \cdot 2H_2O + Mg(OH)_2$$

and yield difficult soluble products cementing the floury components of the starting material with one another, which products then are shapened and hardened by being dried in rotated and heated drums.

The amount of water necessary to dissolve the magnesium sulphate is preferably so large that the moist-crumbly product contains about from 15 to 20% by weight of moisture prior to being subjected to the drying, shaping and hardening phase.

It is suitable to the object in view to employ the calcium salt and the magnesium sulphate in a stoichiometric or equivalent proportion relatively to one another, although an excess of the one or the other of the two cheap additional substances is not detrimental to the granulating process, but it is at any rate advisable to choose the amount of the magnesium sulphate not below 5% with relation to the resulting granular fertilizing salt. Owing to both contrivances, cementing substances in an amount sufficient for the complete and lasting agglomeration are produced and simultaneously therewith important plant nourishing salts are introduced into the potassium fertilizing salt.

Instead of employing the calcium oxide in solid form and the magnesium sulphate in dissolved form, both substances may be admixed to the starting material in finely pulverized solid state without any reduction of the success, whereafter from 15 to 20% by weight of water, relatively to the weight of the mixture, are added, and finally this mixture is dried and hardened, as already stated; or both substances may be used in pulpy state or in dissolved state and added in this state to the potassium fertilizer to be agglomerated singly and one after the other after each has been intimately mixed with the starting material.

If a starting material containing potassium chloride contains already in any form, for instance in the form of kieserite, also the magnesium sulphate requisite for the formation of the cementing agent, then only calcium oxide need be added.

Example 1

92 kg. of dried vacuum potassium chloride with 87% of KCL and 13% of NaCl, corresponding to a commercial kali fertilizing salt with 55% $K_2O$, are intimately mixed with a solution consisting of 5 kg. of $MgSO_4$ and 12,5 kg. of water. Thereafter 2,33 kg. of CaO that have been slaked in 5,2 liters of water are added. After thorough mixing of said substances the crumbly agglomerated mixture is shaped, dried and hardened in a heated rotary drum. There are obtained in this way about one hundred kg. of a sufficiently solid, despatchable and shaped salt with 1,7% of MgO, 2,3% of CaO and about 50% of K₂O.

Screen analysis

| Size of grains | Starting material (technical calcium chloride) | Agglomerated product |
|---|---|---|
| mm. diameter | Percent | Percent |
| Above 3 | 0,7 | 13,72 |
| Above 1-3 | 1,1 | 83,03 |
| Above 0,5-1 | 9,5 | 2,03 |
| Below 0,5 | 88,7 | 1,22 |

Example 2

95 kg. of crude potassium salt with a contents of 32% of KCl and 8% of kieserite (MgSO₄·1H₂O), corresponding to a commercial crude potassium salt with a contents of 20% of K₂O, are intimately mixed with 2,75 kg. of ground burnt lime (85% of CaO) slaked in about 18 kg. of water. After thorough stirring the moist, crumbly product is shaped in a heated rotary drum and dried therein. There are obtained about 100 kg. of agglomerated crude potassium salt containing 2,2% of MgO, 2,3% of CaO and 19,3% of K₂O.

Screen analysis

| Size of grains | Starting material (crude potassium salt) | Agglomerated product |
|---|---|---|
| mm. diameter | Percent | Percent |
| Above 3 | 0,0 | 12,7 |
| Above 1-3 | 0,6 | 79,8 |
| Above 0,5-1 | 16,1 | 3,7 |
| Below 0,5 | 83,3 | 3,8 |

We claim:

1. In a method of manufacturing an agglomerated potassium chloride fertilizer from substances selected from the group consisting of technical potassium chloride, crude potash salt containing potassium chloride, and a mixture of these substances, intimately mixing with the respective substances amounts of calcium oxide (CaO) and of magnesium sulphate (MgSO₄) small in proportion to the amount of said potassium chloride containing substance, effecting interaction of the added calcium oxide and magnesium sulphate and the agglomeration of the thus obtained components in the presence of water, by agitation and causing the crumbly moist product containing from 15% to 20% of water to travel in a heated rotary drum, drying the mixture and transforming it into hard dry granules.

2. In a method of manufacturing an agglomerated potassium chloride fertilizer from substances selected from the group consisting of technical potassium chloride, crude potash salt containing potassium chloride, and a mixture of these substances, intimately mixing with these respective substances about equal amounts of calcium oxide (CaO) and of magnesium sulphate (MgSO₄) small in proportion to the amount of the said potassium chloride containing substance, effecting interaction of the added calcium oxide and magnesium sulphate and the agglomeration of the thus obtained composition in the presence of water, agitating and causing the moist crumbly product containing from 15% to 20% of water, to travel in a heated rotary drum, drying the mixture, and transforming it into hard dry granules.

3. In a method of manufacturing an agglomerated potassium chloride fertilizer from substances selected from the group consisting of technical potassium chloride, crude potash salt containing potassium chloride, and a mixture of these substances, intimately mixing with the respective substances an amount of finely pulverized calcium oxide (CaO) small in proportion to the amount of said potassium chloride containing substance, mixing intimately with the thus obtained composition an amount of dissolved magnesium sulphate (MgSO₄) likewise small in proportion to the amount of the said potassium chloride containing substance, effecting interaction of the added calcium oxide and magnesium sulphate, and the agglomeration of the thus obtained components in the presence of water, agitating the moist and crumbly product containing from 15% to 20% of water in a heated rotary drum, drying the mixture and transforming it into dry hard granules.

4. In a method of manufacturing an agglomerated potassium chloride fertilizer from substances selected from the group consisting of technical potassium chloride, crude potash salt containing potassium chloride, and a mixture of these substances, intimately mixing with the respective substances an amount of an aqueous suspension of calcium oxide (CaO) small in proportion to the amount of said potassium chloride containing substance, adding to said mixture an amount of pulverulent magnesium sulphate (MgSO₄) likewise small in proportion to the amount of the said potassium chloride containing substance, increasing the total contents of the water in the thus produced composition up to from 15 to 18%, mixing again intimately all components of the composition, effecting the interaction of the added calcium oxide and magnesium sulphate and the agglomeration of the thus obtained components in the presence of water, agitating the moist and crumbly product containing from 15% to 20% of water in a heated rotary drum, drying the product therein to hard dry granules.

5. In a method of manufacturing an agglomerated potassium chloride fertilizer from substances selected from the group consisting of technical potassium chloride, crude potash salt containing potassium chloride, and a mixture of these substances, intimately mixing with the respective substances an amount of magnesium sulphate (MgSO₄) small in proportion to the amount of said potassium chloride containing substance, and dissolving in water with the said potassium chloride containing substance, adding an amount of dry pulverulent calcium oxide (CaO) likewise small in proportion to the amount of potassium chloride containing substance, mixing all components stated intimately, effecting interaction of the added magnesium sulphate and calcium oxide and the agglomeration of the thus obtained components in the presence of water, agitating the moist and crumbly product containing from 15 to 20% of water, causing it to travel in a heated rotary drum, drying the mixture and transforming it into hard dry granules.

6. In a method of manufacturing an agglomerated potassium chloride fertilizer from substances selected from the group consisting of technical potassium chloride, crude potash salt containing potassium chloride, and a mixture of these substances, intimately mixing an amount of an aqueous suspension of calcium oxide (CaO) small in proportion to the amount of said potassium chloride containing substance, mixing intimately with said composition an amount of an aqueous solution of magnesium sulphate ($MgSO_4$) likewise small in proportion to the amount of the said potassium chloride containing substance, effecting the interaction of the added calcium oxide and magnesium sulphate and the agglomeration of the thus obtained components in the presence of water, and agitating the moist and crumbly product containing from 15 to 20% of water, causing it to travel in a heated rotary drum, drying the mixture and transforming it into hard dry granules.

7. In a method of manufacturing an agglomerated potassium chloride fertilizer from substances selected from the group consisting of technical potassium chloride, crude potash salt containing potassium chloride, and a mixture of these substances, adding simultaneously an amount of dry pulverized calcium oxide (CaO) and of dry pulverized magnesium sulphate ($MgSO_4$), both amounts small in proportion to the amount of said potassium chloride containing substance, stirring all said substances together with water, mixing intimately, effecting interaction of the added calcium oxide and magnesium sulphate and the agglomeration of the thus obtained components in the presence of water, agitating and causing the moist and crumbly product containing from 15% to 20% of water to travel in a heated rotary drum, drying the product and transforming it into dry hard granules.

8. In a method of manufacturing an agglomerated potassium chloride fertilizer from substances selected from the group consisting of technical potassium chloride, crude potash salt containing potassium chloride, and a mixture of these substances, intimately mixing with the respective substances an amount of pulverulent dry magnesium sulphate ($MgSO_4$) small in proportion to the amount of said potassium chloride containing substance, adding an amount of a suspension in water of calcium oxide (CaO) likewise small in proportion to the amount of the said potassium chloride containing substance, mixing intimately the composition formed by the substances stated, with said suspension, effecting interaction of the added magnesium sulphate and calcium oxide and the agglomeration of the thus obtained components of the mixture in the presence of water, by agitation, and causing the mixture of the moist and crumbly product containing from 15% to 20% of water to travel in a heated rotary drum, drying the mixture therein and transforming it into dry hard granules.

KARL HAASE.
HELMUT WERTH.
HERMANN PROBST.